J. B. KOPF.
NON-SLIPPING OVERSHOE FOR HORSES.
APPLICATION FILED NOV. 7, 1911.
1,023,431.
Patented Apr. 16, 1912.
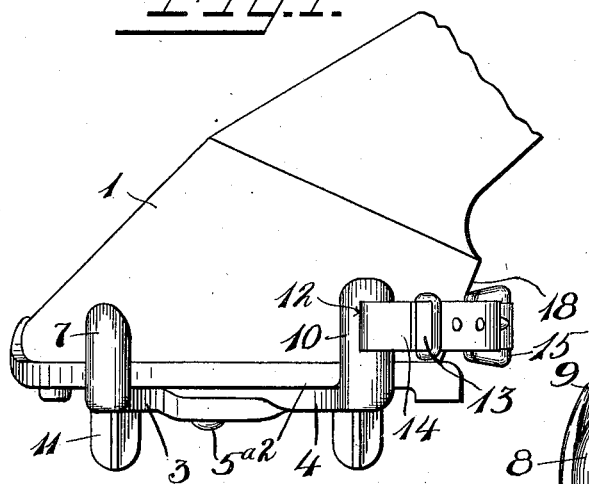
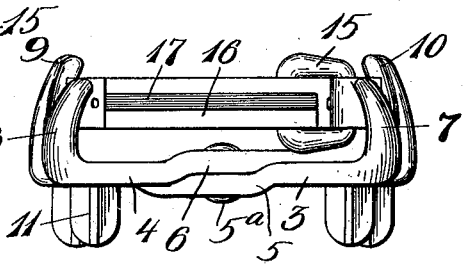
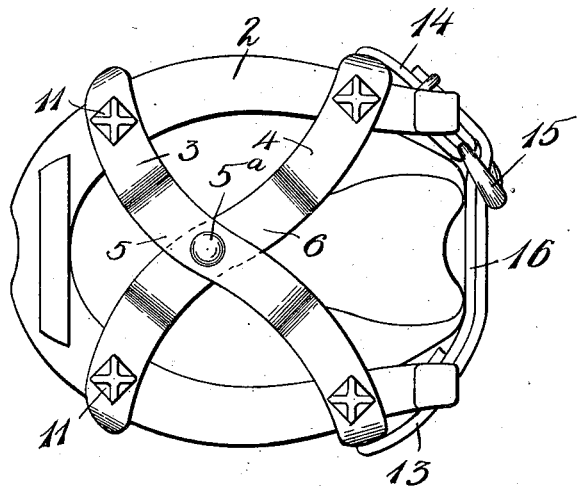
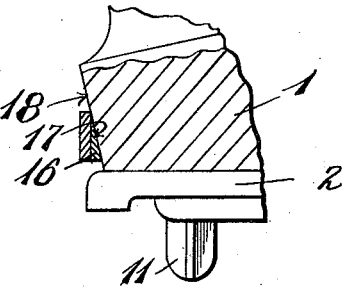
Witnesses:
Inventor
J. B. Kopf
COLUMBIA PLANOGRAPH CO., WASHINGTON, D. C.

UNITED STATES PATENT OFFICE.

JOSEPH B. KOPF, OF ROCKVILLE CENTER, NEW YORK.

NON-SLIPPING OVERSHOE FOR HORSES.

1,023,431. Specification of Letters Patent. Patented Apr. 16, 1912.

Application filed November 7, 1911. Serial No. 658,989.

*To all whom it may concern:*

Be it known that I, JOSEPH B. KOPF, a citizen of the United States, residing at Rockville Center, Nassau county, New York, have invented certain new and useful Improvements in Non-Slipping Overshoes for Horses, of which the following is a full, clear, and exact description.

My invention relates to non-slipping overshoes or ice-creepers for horses.

The object of the invention is to provide a device of this character which may be readily attached or detached from the horse's hoof, and which, when in operative position, will be securely held against all influences tending to detach the same.

A further object of the invention is to make the device automatically adjustable to conform snugly to the particular size and shape of hoof to which it is attached.

A further object is to produce a simple, compact and economical device for the purpose intended.

With these objects in view, the invention consists in a construction and arrangement of parts, the preferred embodiment of which is illustrated in the accompanying drawings, in which, Figure 1 is a side elevation of a horse's hoof with my improved device attached thereto. Fig. 2 is a bottom plan view of the hoof with the device attached. Fig. 3 is an elevation of the device detached from the hoof and looking from the front, and Fig. 4 is a fragmentary sectional view of the rear portion of the hoof and shoe showing a detail of construction.

In the embodiment of my invention herein selected for illustration, 1 is the horse's hoof.

2 is an ordinary shoe attached thereto in the usual manner.

A device embodying my invention comprises what may be termed a lazy-tongs construction consisting of the arms 3 and 4 pivoted near their centers at 5ª. As will be seen from an inspection of Figs. 1 and 3 particularly, these arms 3 and 4 are offset adjacent their pivotal point as at 5 and 6 in order that the ends of said members may lie in the same plane. The forward ends of the members 3 and 4 are provided with clamping arms 7 and 8, said arms being curved inwardly to conform closely to the retreating shape of the upper surface of the hoof. The rear ends of these arms are provided with similar clamping arms 9 and 10, which likewise curve inwardly for the same purpose, these arms preferably being made slightly longer than the forward clamping arms 7 and 8 in order to afford a good grip upon the rear of the hoof. The ends of the members 3 and 4 are provided with calks 11—11, which may be screwed or otherwise removably fastened to the members so that when they become broken or worn, they may be replaced by new parts. The rear clamping arms 9 and 10 are slotted as at 12 to receive the buckle straps 13 and 14, adapted to be connected by a buckle 15 by which straps the device may be firmly secured to the hoof.

From an inspection of Figs. 2 and 4, it will be seen that the strap 13 is provided with a reinforcing strip 16 beveled at 17 whereby the strap is thickened and strengthened along its lower edge, and the beveled portion takes beneath the slant 18 of the rear of the horse's hoof. It will be observed also that the straps 13 and 14 lie above the rear ends of the horse's shoe. This effectually prevents the device from slipping off the hoof. Furthermore, the bevel of the strengthening piece 16 prevents the strap from slipping up on the horse's hoof, and finally, when the strap is drawn taut across the rear of the hoof, this thickening member fills the space between the strap 13 and the rear of the hoof and insures snug engagement of the fastening means with the hoof.

While I have herein described a particular embodiment of my invention, it should be understood that the same may be altered in details and relative arrangement of parts within the scope of the appended claims.

What I claim is:—

1. A device of the character described, the combination of a pair of arms pivoted together intermediate of their lengths, and having anti-slipping devices on their under side, clamping members at or adjacent to the extremities of said arms, and a tightening strap extending across the hoof above the shoe and connecting the two adjacent clamping members of said arms, said strap having a beveled hoof-contacting face adapted to prevent movement of the tightened strap relative to the hoof.

2. A device of the character described, the combination of a horse's shoe, of a pair of pivoted arms adapted to overlie the underside of said shoe, the forward extremities of said arms having clamping members adapted to engage the edge of the forward portion of said shoe, the rear extremities of said arms having clamping members adapted to engage the rear edges of said shoe, a buckle attached to one of said rear clamping members and a strap attached to the other, said strap having a thickened portion at its lower edge to take beneath the rear portion of the horse's hoof, said strap and buckle being arranged to lie above the rear extremities of the shoe, whereby the device may be held securely in engagement with said shoe and hoof, and the strap may be prevented from slipping up or down on the hoof, said pivoted members having anti-slipping tread members on the underside.

JOSEPH B. KOPF.

Witnesses:
 CHAS. A. PEARD,
 E. E. MORSE.

Copies of this patent may be obtained for five cents each, by addressing the "Commissioner of Patents, Washington, D. C."